(12) United States Patent
Thubert et al.

(10) Patent No.: US 12,537,622 B2
(45) Date of Patent: Jan. 27, 2026

(54) ADAPTIVE FORWARD ERROR CORRECTION IN LOW-POWER WIDE AREA NETWORKS (LPWANS)

(71) Applicant: Cisco Technology, Inc., San Jose, CA (US)

(72) Inventors: Pascal Thubert, Roquefort les Pins (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/227,913

(22) Filed: Jul. 29, 2023

(65) Prior Publication Data

US 2025/0038886 A1    Jan. 30, 2025

(51) Int. Cl.
*H04L 1/00* (2006.01)
*H03M 13/47* (2006.01)

(52) U.S. Cl.
CPC ............ *H04L 1/007* (2013.01); *H04L 1/0041* (2013.01); *H03M 13/47* (2013.01)

(58) Field of Classification Search
None
See application file for complete search history.

(56) References Cited

U.S. PATENT DOCUMENTS

| | | | |
|---|---|---|---|
| 9,246,630 B2 * | 1/2016 | Dui | H04L 1/007 |
| 11,165,541 B2 | 11/2021 | Merlin et al. | |
| 11,395,225 B1 | 7/2022 | Wong et al. | |
| 11,425,228 B2 | 8/2022 | Thubert et al. | |
| 11,489,620 B1 * | 11/2022 | Ananthanarayanan | H04L 1/0009 |
| 2006/0048036 A1 * | 3/2006 | Miura | H04L 1/0059 714/758 |
| 2007/0157060 A1 * | 7/2007 | Ganga | H04L 1/0058 714/752 |
| 2008/0253475 A1 * | 10/2008 | Majima | H04L 1/007 375/296 |

(Continued)

FOREIGN PATENT DOCUMENTS

CN    110855400    2/2022

OTHER PUBLICATIONS

O. J. Pandey, T. Yuvaraj, J. K. Paul, H. H. Nguyen, K. Gundepudi and M. K. Shukla, "Improving Energy Efficiency and QoS of LPWANs for IoT Using Q-Learning Based Data Routing," in IEEE Transactions on Cognitive Communications and Networking, vol. 8, No. 1, pp. 365-379, Mar. 2022, (Year: 2021).*

(Continued)

*Primary Examiner* — Daniel F. McMahon
(74) *Attorney, Agent, or Firm* — Lee & Hayes, P.C.

(57) ABSTRACT

In one embodiment, techniques for adaptive forward error correction (FEC) in Low-Power Wide Area Networks (LPWANS) are disclosed. The techniques may include determining, by a process, for a block of messages transmitted through a computer network with forward error correction, whether any unrecovered data loss occurred during transmission; increasing, by the process, a level of forward error correction used to transmit through the computer network in response to unrecovered data loss; and/or decreasing, by the process, the level of forward error correction used to transmit through the computer network in response to no unrecovered data loss.

20 Claims, 5 Drawing Sheets

(56) References Cited

U.S. PATENT DOCUMENTS

| | | | |
|---|---|---|---|
| 2010/0122141 A1* | 5/2010 | Arye | H04L 47/10 |
| | | | 714/752 |
| 2010/0150243 A1* | 6/2010 | Kure | H04L 1/007 |
| | | | 370/230.1 |
| 2010/0316381 A1* | 12/2010 | de Lind van Wijngaarden | |
| | | | H04Q 11/0067 |
| | | | 398/58 |
| 2012/0317461 A1* | 12/2012 | Hwang | H04L 1/0041 |
| | | | 714/776 |
| 2013/0145236 A1* | 6/2013 | Baker | H04L 1/0057 |
| | | | 714/E11.01 |
| 2013/0343750 A1* | 12/2013 | Lanzone | H04L 1/0009 |
| | | | 398/34 |
| 2016/0036467 A1* | 2/2016 | Babaei | H04J 3/1694 |
| | | | 714/774 |
| 2018/0248650 A1* | 8/2018 | Das Sharma | H04L 1/0009 |
| 2019/0028231 A1* | 1/2019 | Wang | H04L 1/009 |
| 2019/0138939 A1* | 5/2019 | Devaraju | G05B 23/0289 |
| 2020/0177311 A1* | 6/2020 | Ho | H03M 13/6547 |
| 2022/0069918 A1* | 3/2022 | Yue | H04L 1/0057 |
| 2022/0231797 A1 | 7/2022 | Song et al. | |
| 2024/0223218 A1* | 7/2024 | Tofighbakhsh | H03M 13/3738 |

OTHER PUBLICATIONS

Yizheng Zhou, V. Lakamraju, I. Koren and C. M. Krishna, "Software-based adaptive and concurrent self-testing in programmable network interfaces," 12th International Conference on Parallel and Distributed Systems—(ICPADS'06), Minneapolis, MN, USA, 2006, pp. 8 pp.—, (Year: 2006).*

Minaburo, et al., "SCHC: Generic Framework for Static Context Header Compression and Fragmentation", Request for Comments 8724, Apr. 2020, 71 pages, IETF Trust.

* cited by examiner

ADAPTIVE FORWARD ERROR CORRECTION IN LOW-POWER WIDE AREA NETWORKS (LPWANS)

TECHNICAL FIELD

The present disclosure relates generally to computer networks, and, more particularly, to adaptive forward error correction (FEC) in LPWANS.

BACKGROUND

Low-Power Wide Area Networks (LPWANs) such as LoRa and SigFox have gained significant attention in the field of Internet of Things (IoT) due to their ability to enable long-range communication with low-power consumption. However, these LPWANs, particularly those operating in the subgigahertz band, face challenges in achieving efficient downstream data traffic. This limitation arises from the duty cycle rules that equally apply to both the gateways and sensor devices. Consequently, the data traffic becomes highly unbalanced, with the majority of data flowing upstream for collection purposes.

To address the energy efficiency and reliability requirements of LPWANs, the Internet Engineering Task Force (IETF) LPWAN Working Group (WG) has introduced the Static Context Header Compression (SCHC) protocol. This protocol aims to optimize LPWAN communications by employing two key techniques: compression and fragmentation of large payloads. By compressing and fragmenting data, SCHC enables energy savings and enhances reliability. Fragmentation involves dividing large payloads into smaller fragments and employing acknowledgments (ARQ) to ensure the successful transfer of the entire payload, even in the presence of fragment loss.

The absence of defined Forward Error Correction (FEC) or Hybrid Automatic Repeat Request (HARQ) mechanisms in the current specification of the Static Context Header Compression (SCHC) protocol for Low-Power Wide Area Networks (LPWANs) poses significant drawbacks. While SCHC protocol addresses energy efficiency and reliability requirements by implementing compression and fragmentation techniques, the lack of FEC and HARQ mechanisms limits its effectiveness. Without FEC or HARQ, the protocol relies solely on acknowledgments (ARQ) to ensure reliable data transmission. This means that in cases where fragments of a payload are lost during transmission, there is no mechanism in place to recover or correct these errors. Consequently, the protocol's resilience to packet loss is compromised, leading to potential data loss and decreased overall reliability of LPWAN communications. However, conventional FEC or HARQ mechanisms involve computational cost tradeoffs that may degrade the energy savings and/or reliability of the current SCHC specification.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method may include determining, by a process, for a block of messages transmitted through a computer network with forward error correction, whether any unrecovered data loss occurred during transmission; increasing, by the process, a level of forward error correction used to transmit through the computer network in response to unrecovered data loss; and decreasing, by the process, the level of forward error correction used to transmit through the computer network in response to no unrecovered data loss.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
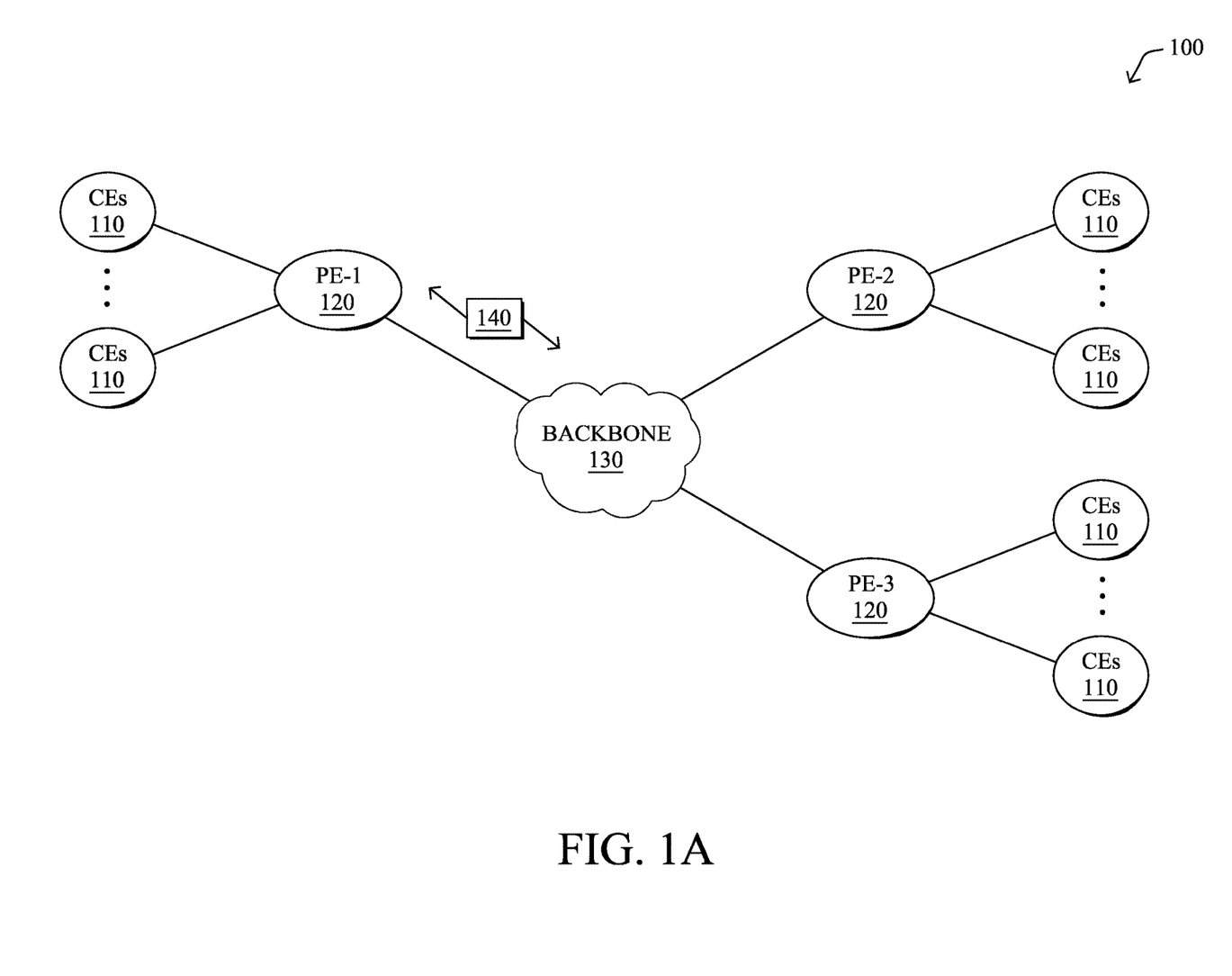
FIGS. 1A-1B illustrate an example of a communication network.

FIG. 1A is a schematic block diagram of an example computer network 100 illustratively comprising nodes/devices, such as a plurality of routers/devices interconnected by links or networks, as shown. For example, customer edge (CE) routers may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
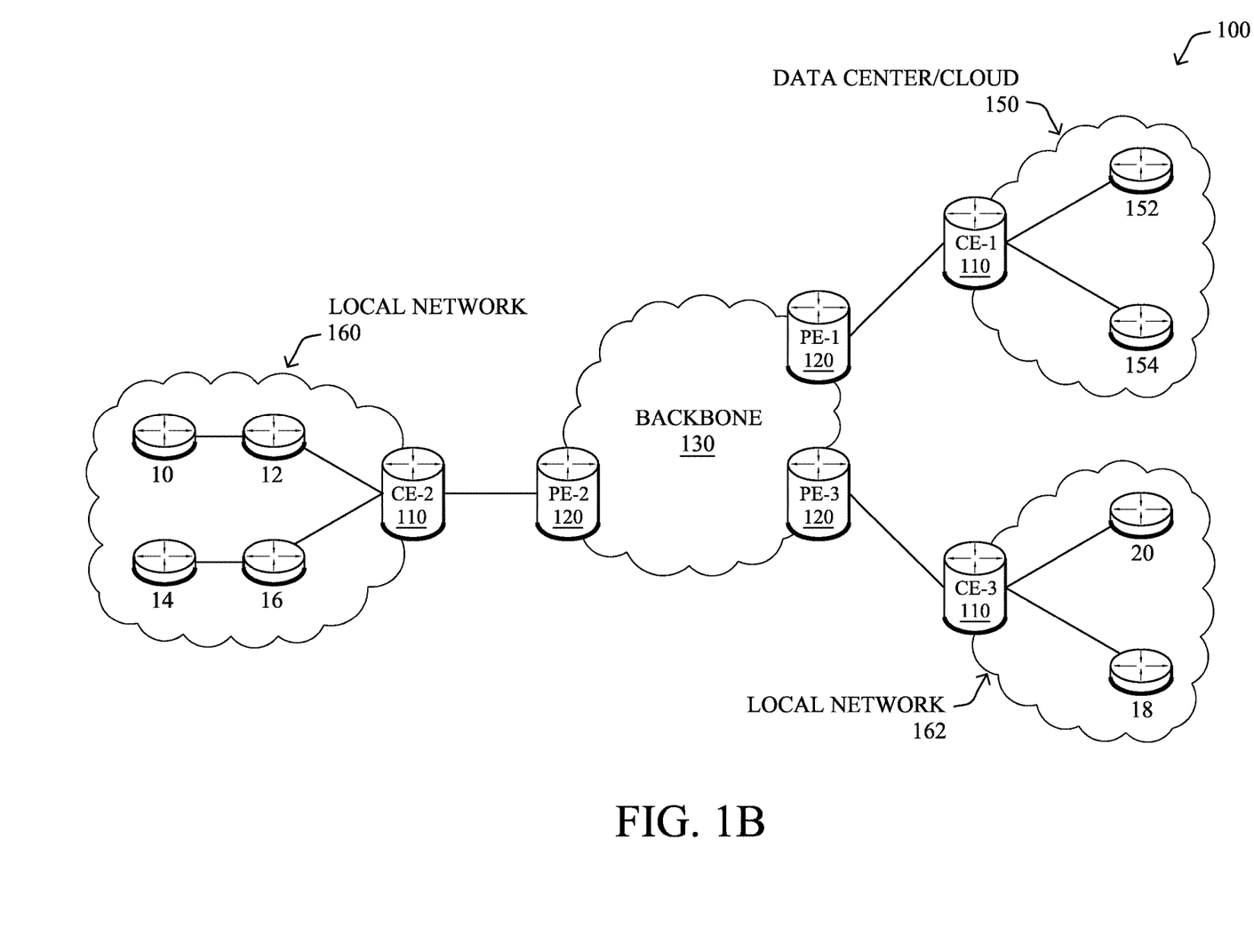

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
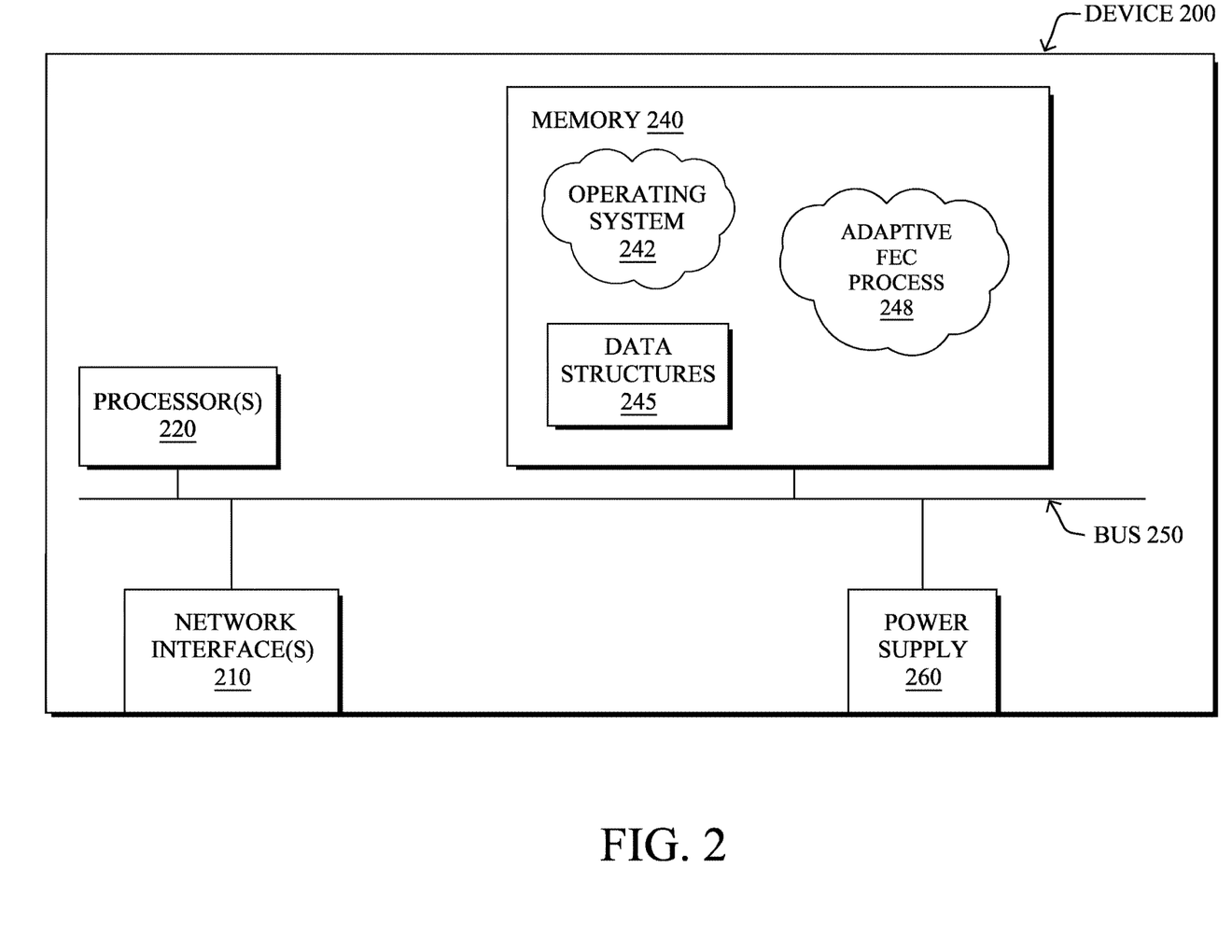
FIG. 2 illustrates an example of a network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise adaptive FEC process 248, as described herein, and/or others any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

The adaptive FEC process 248 includes computer executable instructions that, when executed by processor(s) 220, cause device 200 to adapt the level of FEC used in LPWAN communications to data loss or a lack thereof. In this manner, the level of FEC may be automatically and dynamically adjusted to a precise level that strikes a balance between data fidelity and computational resource conservation in LPWAN communications. To do so, in some embodiments, adaptive FEC process 248 may utilize machine learning (e.g., to predict FEC levels and/or their adjustment).

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, adaptive FEC process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance under various levels of FEC, under various conditions, at various times of day, etc. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the adaptive FEC process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether an FEC level in a LPWAN will satisfy the service level agreement (SLA) and/or loss/computation resource conservation threshold for the traffic on that path. In such a case, the false positives of the model may refer to the number of times the model incorrectly predicted that the FEC level applied to that LPWAN traffic of a particular network path will not satisfy the SLA and/or loss/computational resource conservation threshold of the traffic on that path. Conversely, the false negatives of the model may refer to the number of times the model incorrectly predicted that the FEC level applied to that LPWAN traffic of the path would be acceptable. True negatives and positives may refer to the number of times the model correctly predicted acceptable path performance or an SLA, loss threshold and/or computational resource conservation threshold violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

As noted above, LPWANs like LoRa and SigFox, which operate in the subgigahertz frequency band, have limitations on the amount of data they can transmit in the downstream direction. These limitations are imposed by duty cycle rules, which regulate the amount of time a device can transmit data within a specific time period. These rules apply equally to both the gateways (communication infrastructure) and the sensor devices (connected devices). As a result of these duty cycle limitations, the data traffic in LPWANs is highly unbalanced, with the majority of data transmission occurring in the upstream direction. In other words, the sensor devices, which collect and send data to the gateways, are responsible for transmitting a significant portion of the overall data traffic. This is because the duty cycle rules allow for more frequent and longer transmissions in the upstream direction compared to the downstream direction. This unbalanced data traffic pattern is a characteristic of LPWANs operating in the subgigahertz band, and it is influenced by the regulatory constraints imposed on these networks.

Internet Engineering Task Force (IETF) LPWAN Working Group (WG) has introduced the Static Context Header Compression (SCHC) protocol to enable energy savings and higher reliability by 1) compressing and 2) fragmenting large payloads. The fragmentation uses windows and acknowledgments (e.g., automatic repeat request (ARQ)) to ensure that the whole large payload is transferred even in the case of the loss of one small fragment. There are effectively 2 ARQ modes in SCHC, 'ack-always' and ack-on-error.' With the ack-always mechanism, the receiver always sends an acknowledgment (ACK) to the sender for every successfully received data packet, regardless of whether errors were detected or not. With this mechanism, the sender assumes that the data was successfully received if it receives an ACK and proceeds to transmit the next packet. With the ack-on-error mechanism, the receiver sends an acknowledgment (ACK) to the sender only when it detects that a data packet has been received with errors or has been lost. In this mechanism, if the receiver successfully receives a packet without errors, it does not send an ACK, assuming that the packet was received correctly. Further, in this mechanism the sender may retransmit the packet if it does not receive an ACK within a certain time period. These mechanisms involve a tradeoff that costs in downstream (e.g., for the ack) to save on upstream (e.g., resending the large payload later).

Currently, there is no FEC or HARQ mechanism defined for SCHC. The introduction of an FEC and/or HARQ mechanism would shift the burden of the additional transmission to be assumed on the upstream as opposed to the downstream channel. Of additional concern in introducing such mechanisms, the conditions in LPWANs vary with the amount of noise while devices can remain in place for many years. Consequently, a hard coded value for FEC is likely to waste computational resources (e.g., power usage, processing capacity, memory, storage capacity, network bandwidth, computational efficiency, energy efficiency, etc.) at times, and be insufficient to adequately correct for loss at others.

—Adaptive Forward Error Correction (FEC) in LPWANS—

The techniques herein introduce mechanisms to adapt FEC levels dynamically and aggressively to loss conditions as they are experienced and/or predicted (e.g., by predictive ML techniques, historical data, etc.). These mechanisms may be utilized to dynamically and adaptively strike a balance between computational resource conservation and loss correction in LPWAN communications by adjusting a level of FEC that is applied to those communications.

Specifically, according to one or more embodiments of the disclosure as described in detail below, these mechanisms may include determining, by a process, for a block of messages transmitted through a computer network with forward error correction, whether any unrecovered data loss occurred during transmission; increasing, by the process, a level of forward error correction used to transmit through the computer network in response to unrecovered data loss; and decreasing, by the process, the level of forward error correction used to transmit through the computer network in response to no unrecovered data loss.

Illustratively, the techniques described herein may be performed by hardware, software, and/or firmware, such as in accordance with the adaptive FEC process 248, which may include computer executable instructions executed by the processor 220 (or independent processor of interfaces 210) to perform functions relating to the techniques described herein and/or in conjunction with other processes (e.g., window/frame definition and/or construction processes, transmission processes, etc.).

Figure 3:
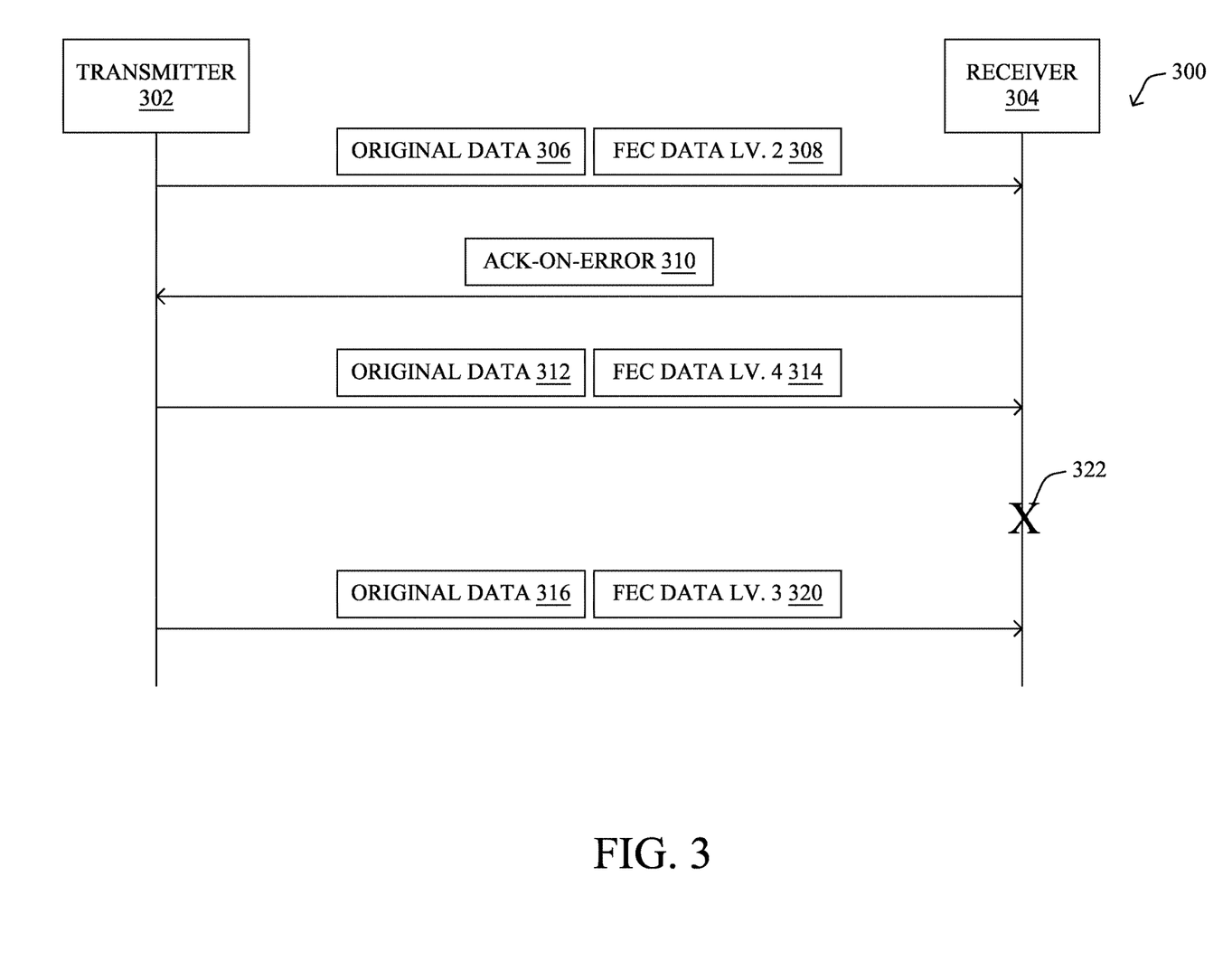
FIG. 3 illustrates a sequence diagram of an example process for adaptive FEC in LPWANs.

Operationally, FIG. 3 illustrates an example of a sequence diagram for a process of adaptive FEC in LPWANs according to various embodiments. Process 300 may involve the dynamic and adaptive application of FEC techniques to LPWAN communications. FEC techniques can be used in data transmission of enhance reliability and accuracy of data reception.

Generally, FEC techniques may operate by adding redundant information to transmitted data which facilitates a receiver in detecting and/or correcting errors without the need for retransmissions. For example, a transmitting device may take original data and apply an FEC encoding algorithm to generate additional redundant data (e.g., parity, error correction code, etc.). This encoding process may add redundancy by introducing mathematical relationships among the original data and generated redundant data. The transmitting device may send the encoded data, which consists of the original data and/or the added redundant data, over the communication channel to a receiving device.

The receiving device may receive the transmitted data which may contain errors due to noise, interference, other transmission issues, etc. Based on the additional redundant FEC information corresponding to the original data, the receiving device may utilize a decoding algorithm to identify and/or correct any errors in the received data. By comparing the received data with the redundant data, the algorithm may be able to reconstruct the original error-free data. The corrected data may then be passed on to higher levels of the receiving system for further processing or utilization. The amount of redundancy added by the FEC encoding algorithm determines the error correction capability. Higher levels of redundancy can correct a greater number of errors, but they also increase the overhead and reduce the effective data rate.

Unlike traditional FEC techniques, the FEC techniques used in process 300 may include an error recognition component that facilitates dynamic adaptation of the FEC level (e.g., level of data redundancy, etc.) to experienced and/or predicted data loss in LPWAN communications. This error recognition component may include a mechanism to detect when unrecovered data loss between a transmitting device (e.g., transmitter 302) and a receiving device (e.g., receiver 304) has and/or has not occurred. For example, process 300 may incorporate a HARQ-like error recognition component. For instance, the error recognition component may incorporate an ack-on-error SCHC mechanism that leverages an ack-on-error to identify data loss and/or to trigger dynamic adjustment of a level of FEC being applied to LPWAN communications.

Therefore, process 300 may involve detection of a data loss in an LPWAN transmission triggering an adaptation of the FEC level being applied to subsequent LPWAN communications. For example, a transmitter 302, such as an IoT device, etc., may encode FEC data for original data 306 that will be communicated to a receiver 304 such as another IoT device, an IoT hub, etc. or vice versa. The FEC data may be error correcting information that is in addition to the original data 306. For example, the FEC data may be additional redundant data and/or data that introduces a mathematical relationship between the original data and the generated redundant data. The FEC data may include parity, error correction code, etc. data for the original data 306. That is, the FEC data may include the data and/or relationships necessary to accurately reconstruct and recover the original data 306 in the event of its loss.

The FEC data may be encoded at a particular FEC level. An FEC level may refer to a degree or an amount of redundancy added through FEC techniques (e.g., encoding) in the LPWAN communication system. The level may determine the extent to which the original data 306 is augmented with additional error-correcting information. In various embodiments, a higher FEC level may imply the inclusion of more redundancy and/or more error-correcting information in FEC data accompanying the original data 306, which can increase a system's (e.g., receiver 304, upper layers, applications, etc.) ability to detect and recover data loss but which also consumes additional computational resources. In some instances, predefined FEC levels are known from both sides and the FEC level used for one block of fragments may be signaled in all fragments of that block together with a block number.

As previously noted, FEC mechanisms are not presently part of the SCHC protocol and conventional FEC mechanisms utilize a hard-coded value for FEC which is a fixed or predetermined FEC level that is manually set or defined within the system's configuration or code. This means that the FEC level is statically assigned and remains unchanged regardless of the specific requirements or conditions of the communication channel. As such, the FEC level does not adapt or adjust dynamically based on the channel characteristics or varying conditions. Instead, a specific value is preconfigured and applied uniformly to all transmissions. This approach may not be flexible enough to handle different channel conditions effectively. For example, the hard-coded value for FEC may not be optimal for all situations. In some cases, it may provide excessive redundancy, leading to wasted computational resources, such as power or bandwidth. At other times, the fixed FEC level may be insufficient to cope with the level of data loss present in the channel, resulting in degraded performance or increased error rates.

For example, transmitter 302 may encode FEC data using a designated FEC level (e.g., level 2) resulting in the production of FEC data (level 2) 308. FEC data (level 2) may include an amount or degree of error-correcting data for data loss identification and/or recovery of the original data 306 that may be included in the FEC data which is more than what would result from encoding at a lower FEC level and less than what would result from encoding at a higher FEC level. The original data 306 and its corresponding FEC data (e.g., FEC data (level 2) 308) may be transmitted to receiver 304.

Receiver 304 may receive the data packets of original data 306 and check them for errors (e.g., using error detection techniques) and/or attempt to correct any data loss using the FEC data (level 2) 308 within a FEC window of frames (e.g., a block) that it received. In various embodiments, a window may be defined as a number of transmitted L2 frames. An L2 frame may be a full packet or a SCHC fragment. For that window, a loss condition (e.g., data loss, data not lost, etc.) can be detected at the SCHC level or at an upper level.

In various embodiments, even frames that could be sent individually are sent by transmitter 302 as SCHC fragments of a larger block of X frames, for which the SCHC FEC performs Y transmissions, Y>=X. Although denoted described in context of level 2, level 3, level 4, etc. for ease of conceptualization, the SCHC FEC level may, in some instances, be expressed as Y/X where Y/X>=1. For example, in a 5/4 XOR-based FEC, SCHC would send a 5th fragment that is the XOR of the first 4. If at most 1 of the first 4 transmissions is lost, the upstream received can recover it by XOR'ing the other 3 with the 5th. In that case there is no ack-on-error issued (e.g., acknowledgement 310 is not sent or received). This XOR example is a non-limiting one and it should be appreciated that any FEC with a reliability scale (e.g., for a cost) can be utilized.

In some cases, the receiver 304 may determine that a data loss was not able to be recovered using the FEC data (level 2) 308 within a FEC window of frames (e.g., a block). For example, the FEC data (level 2) 308 may be insufficient to recover any data loss in the original data 306 as received by the receiver 304 resulting in unrecovered data loss at the receiver 304. In some instances, if additional error-correcting information were included in the FEC data, such as would be the case if a higher FEC level had been used to encode the FEC data, then the FEC data may have been sufficient to recover the lost data. Regardless, receiver 304 may send an acknowledgement 310 to transmitter 302 signaling that its attempts recover the loss of original data 306 using the FEC data (level 2) 308 failed. Acknowledgement 310 may be a negative acknowledgement and/or may only be sent once the FEC fails to recover the loss. In this manner, acknowledgement may serve as a FEC failure signaling component of an ack-on-error based HARQ-like SCHC mechanism that is leveraged to make adjustments to FEC levels.

Transmitter 302 may discover that a data loss for the original data 306 occurred and/or was not recovered by the FEC data (level 2) 308 based on receiving an acknowledgement 310 from receiver 304. In additional and/or alternate embodiments, the acknowledgement 310 FEC failure signal may be replaced by pure FEC (no ack), leveraging the upper layer to detect the lack of a response from the application and considering that the cause is the loss of an upstream fragment in the associated block. In addition, the downstream packets may be sequenced from the network server, and if no sequence is missing, then the loss was not downstream.

In response to discovering the loss, an adjustment may be made to the FEC level utilized in subsequent transmissions and/or retransmissions. For instance, the amount or level of FEC applied to the LPWAN transmissions may be increased in response to the discovery of an unrecovered loss. In various embodiments, the FEC level may be increased exponentially with the amount of non-recovered losses and consecutive blocks with loss.

Again, predefined FEC levels may be known from both sides (e.g., transmitter 302 and receiver 304) and the FEC level used for one block of fragments may be signaled in all fragments of that block together with a block number. A block may be a SCHC window but that does not have to be the case. If an ack-on-error is received (e.g., acknowledgement 310), the FEC may be augmented, and augmented more aggressively with the number of missed fragments, e.g., one step in the scale per fragment lost in the block. If a mostly linear scale is used for the FEC levels, then the exponential increase may mean jumping one step, then two steps, then four steps. However, in various embodiments, the FEC levels may be already chosen so that progressing up the scale by one step effectively multiplies Y/X. In such a case, one loss in one block may trigger increasing one step in the FEC levels, two losses in one block may trigger increasing two steps in the FEC levels, etc., with consecutive blocks with loss taking one more step each.

As the FEC level being utilized increases, the size of the block may also increase. Either way, there may be no loss in a block when one step is taken down. In addition, minimum and maximum FEC levels may be defined for process 300. These values may represent the extreme values (e.g., highest, and lowest) values in the scale of FEC levels. Once these values are reached, the FEC value may stay there until it can either be reduced in the case of the maximum or increased in the case of the minimum.

As previously mentioned, ML techniques may be utilized to predict FEC levels. For example, a learning machine (e.g., an ML technique) could be used to predict if the FEC level should go up or down. The time horizons dealt with can be very long (e.g., sensors or actuators using this type of technology usually are installed for years), however, ML techniques may be useful in predicting the occurrence of errors and/or the need for different FEC levels over various periods of time. For instance, the ML techniques may be utilized to detect that the loss errors typically happen during specific time of the day. In these cases, adequate FEC levels (e.g., increased FEC levels) can be predicted for those specific times of the day. In addition, ML techniques may be utilized to optimize the size of the block as well.

Regardless of the mechanism used to determine the FEC level adjustment, the adjustment may be implemented and/or applied to encode subsequent data transmissions and/or retransmissions from the transmitter 302. For example, say that the transmitter discovered (e.g., via acknowledgement 310, via upper layer detection, via an application, via missing sequence detection, etc.) that there were two losses in one block. In such an example the FEC level may be increased from FEC level 2 to FEC level 4. FEC level 4 may include a corresponding amount or level (level 4) of error-correcting data for error identification and/or correction of the original data 306 that may be included in the FEC data. The amount or level of error-correcting data in level 4 may be more than the amount or level of error-correcting data that was in level 2 (e.g., the amount may double with each level increase by one, etc.).

Transmitter 302 may use the adjusted (e.g., increased) FEC level (e.g., FEC level 4) to encode FEC data for original data 312. Here, original data 312 may be a subsequent LPWAN transmission from original data 306. The original data 312 may be partially or wholly different data from original data 306. Alternatively, original data 312 may be a partial and/or complete retransmission of original data 306 triggered by the aforementioned discovery of data loss in the transmission of original data 306. Regardless, the application of the adjusted FEC level (e.g., encoding at that level) to the original data 312 may produce FEC data (level 4) 314.

Transmitter 302 may transmit original data 312 and its corresponding FEC data (e.g., FEC data (level 4) 314) may be transmitted to receiver 304. Receiver 304 may receive the data packets of original data 316 and check them for errors (e.g., using error detection techniques) and/or attempt to recover any data loss using the FEC data (level 4) within the FEC window of frames that it received. If the receiver 304 determines that there was data loss and/or that this data loss was not able to be recovered using the FEC data (level 4) 314 within the FEC window of frames, then an acknowledgement indicating the same (e.g., like acknowledgement 310) may be transmitted to transmitter and trigger a further increase in the FEC level applied to subsequent transmissions.

Alternatively, if the receiver 304 determines that there was no data loss and/or that any data loss was recovered using the FEC data (level 4) 314 within the FEC window of frames then no acknowledgement may be sent to transmitter 302, illustrated as an absence of communication 322 (no ack-on-error). The absence of an acknowledgement (or in alternative embodiments, the presence of an affirmative acknowledgment that there was no data loss) may trigger a decrease in the FEC level applied to subsequent transmissions. For example, transmitter 302 may determine that no data loss has occurred and/or that any data loss that did occur was recovered using the FEC data (level 4) based on not receiving any indication (e.g., via acknowledgement 310, via upper layer detection, via an application, via missing sequence detection, etc.) that the data loss occurred and/or that the data loss was not able to be recovered using the FEC data (level 4) 314 within a threshold amount of time, threshold amount of operations, a threshold amount of sent/received, etc.

In response to determining that no data loss has occurred and/or that any data loss that did occur was recovered using the FEC data (level 4), the FEC data level to be used in subsequent LPWAN communications may be reduced to a lower FEC data level. The amount of FEC level reduction may be reduced incrementally (e.g., one step at a time) and/or exponentially. Here, the FEC level is reduced to level 3 which may encode less error-correcting data than FEC level 4, but more than FEC level 2 in the FEC data that will be sent with corresponding original data. Transmitter 302 may then use the adjusted (e.g., decreased) FEC level (e.g., FEC level 3) to encode FEC data for original data 316. This may produce FEC data (level 3) 320.

Transmitter 302 may transmit original data 316 and its encoded corresponding FEC data (e.g., FEC data (level 3) 320) may be transmitted to receiver 304. Receiver 304 may receive the data packets of original data 316 and check them for errors (e.g., using error detection techniques) and/or attempt to recover any data loss using the FEC data (level 3) 320 within the FEC window of frames that it received. If the receiver 304 determines that there was data loss and/or that this data loss was not able to be recovered using the FEC data (level 3) 320 within the FEC window of frames, then an acknowledgement indicating the same (e.g., like acknowledgement 310) may be transmitted to transmitter 302 and trigger a further increase in the FEC level applied to subsequent transmissions. Alternatively, if the receiver 304 determines that there was no data loss and/or that any data loss was recovered using the FEC data (level 3) 320 within the FEC window of frames then no acknowledgement may be sent to transmitter 302. Process 300 may carry on in this fashion indefinitely, periodically, until a threshold amount of time/event/error level/computational resource usage/amount of FEC level adjustments/etc. is reached, until administrative intervention, etc. dynamically adapting FEC levels to changing error and/or data loss conditions.

Figure 4:
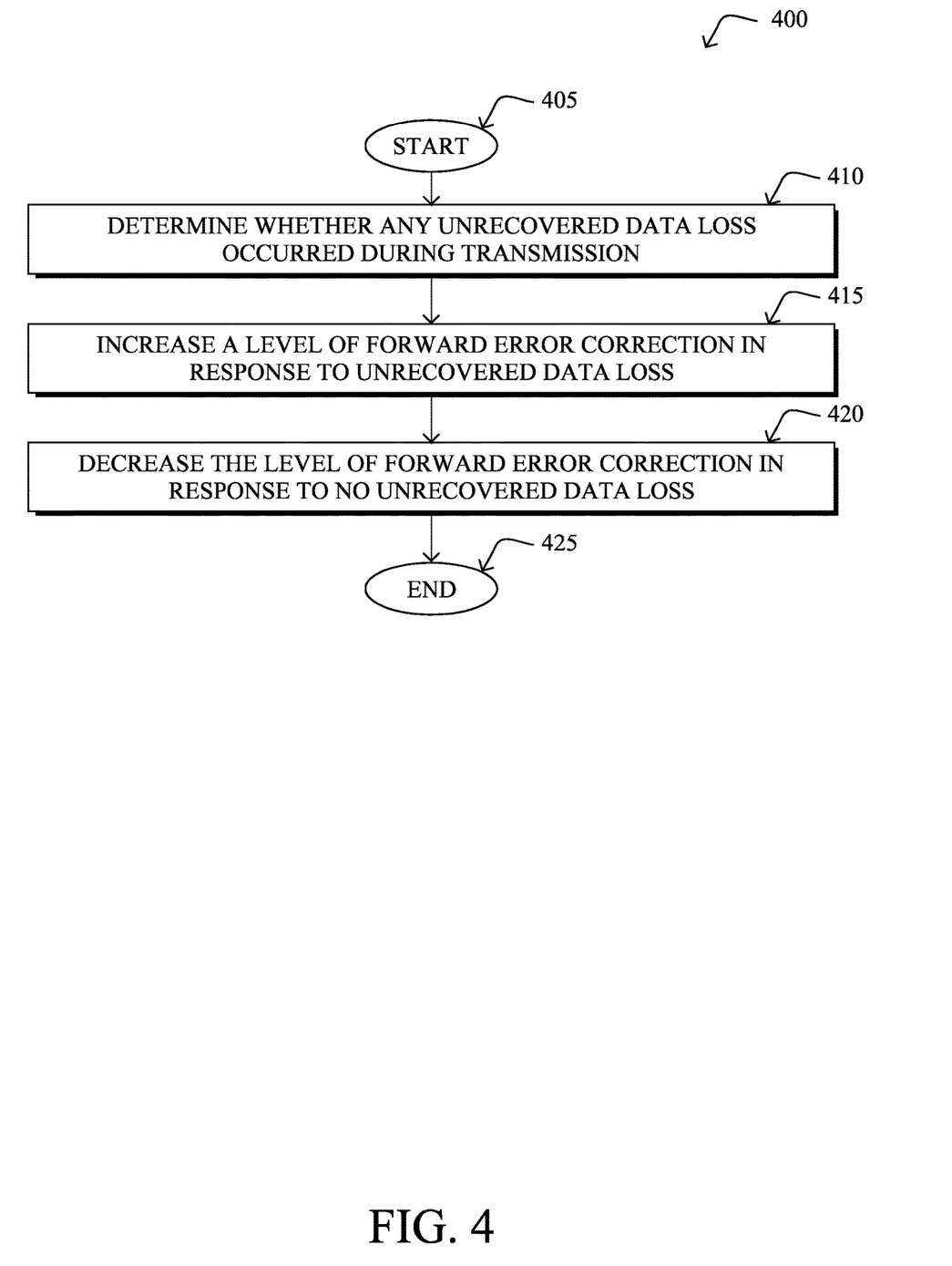
FIG. 4 illustrates an example of a simplified procedure for adaptive FEC in LPWANs.

FIG. 4 illustrates an example simplified procedure for adaptive FEC in LPWANs in accordance with one or more embodiments described herein. For example, a non-generic, specifically configured device (e.g., device 200) may perform procedure 400 by executing stored instructions (e.g., adaptive FEC process 248). The procedure 400 may start at step 405, and continues to step 410, where, as described in greater detail above, a determination may be made for a block of messages transmitted through a computer network with forward error correction, whether any unrecovered data loss occurred during transmission.

The determination whether any unrecovered data loss occurred during transmission may be based on an ack-on-error acknowledgement signaling an unrecovered data loss has occurred. The block of messages may include messages configured as L2 frames or 13 packets. In various embodiments, the block of messages may include messages configured as full packets or SCHC fragments.

At step 415, as detailed above, a level of forward error correction used to transmit through the computer network may be increased in response to unrecovered data loss. In various embodiments, an upper layer process or application may detect data losses.

At step 420, the level of forward error correction used to transmit through the computer network may be decreased in response to no unrecovered data loss, as detailed above. The level of the forward error correction may be increased or decreased linearly. Further, the level of forward error correction may be increased or decreased exponentially. Furthermore, the level of the forward error correction may be increased or decreased based on a number of losses in the block of messages. The level of the forward error correction may be restricted from increasing past a maximum forward error correction level or decreasing past a minimum forward error correction level.

In various embodiments, machine learning may be used to predict when to increase or decrease the level of forward error correction. In addition, machine learning may be used to optimize a size of a block used for forward error correction.

Procedure 400 then ends at step 425.

Procedure 400 may be executed on a receiving device, an observability controller, and/or an observability agent. It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms to adapt FEC levels dynamically and aggressively to loss conditions as they are experienced (e.g., detected by ack-on-error acknowledgment receipt, detected by an application, detected by an upper layer, detected by sequencing analysis, etc.) and/or predicted (e.g., by predictive ML techniques, historical data, etc.). These mechanisms may be utilized to dynamically and adaptively strike a balance between computational resource conservation and loss correction in LPWAN communications by adjusting a level of FEC that is applied to those communications. In this manner, just enough computational effort may be invested in FEC to achieve loss recovery while maximizing computation resource conservation.

According to the embodiments herein, an illustrative method herein may comprise: determining, by a process, for a block of messages transmitted through a computer network with forward error correction, whether any unrecovered data loss occurred during transmission; increasing, by the process, a level of forward error correction used to transmit through the computer network in response to unrecovered data loss; and decreasing, by the process, the level of forward error correction used to transmit through the computer network in response to no unrecovered data loss.

In one embodiment, the level of the forward error correction is increased or decreased linearly. In one embodiment, the level of the forward error correction is increased or decreased exponentially. In one embodiment, the level of the forward error correction is increased or decreased based on a number of losses in the block of messages. In one embodiment, an upper layer process or application detects data losses. In one embodiment, the method further comprising: using machine learning to predict when to increase or decrease the level of forward error correction. In one embodiment, the method further comprising: using machine learning to optimize a size of a block used for forward error correction.

In one embodiment, the block of messages includes messages configured as L2 frames or L3 packets. In one embodiment, the block of messages includes messages configured as full packets or SCHC fragments. In one embodiment, determining whether any unrecovered data loss occurred during transmission is based on an ack-on-error acknowledgement signaling an unrecovered data loss has occurred. In one embodiment, the process is executed on a receiving device or observability controller or agent. In one embodiment, the level of the forward error correction is restricted from increasing past a maximum forward error correction level or decreasing past a minimum forward error correction level.

According to the embodiments herein, an illustrative tangible, non-transitory, computer-readable medium having computer-executable instructions stored thereon that, when executed by a processor on a computer, cause the computer to perform a method comprising: determining for a block of messages transmitted through a computer network with forward error correction, whether any unrecovered data loss occurred during transmission; increasing a level of forward error correction used to transmit through the computer network in response to unrecovered data loss; and decreasing the level of forward error correction used to transmit through the computer network in response to no unrecovered data loss.

In one embodiment, the level of the forward error correction is increased or decreased linearly. In one embodiment, the level of the forward error correction is increased or decreased exponentially. In one embodiment, the level of the forward error correction is increased or decreased based on a number of losses in the block of messages. In one embodiment, an upper layer process or application detects data losses. In one embodiment, the method further comprising: using machine learning to predict when to increase or decrease the level of forward error correction. In one embodiment, the method further comprising: using machine learning to optimize a size of a block used for forward error correction.

Further, according to the embodiments herein an illustrative apparatus herein may comprise: one or more network interfaces to communicate with a network; a processor coupled to the one or more network interfaces and configured to execute one or more processes; and a memory configured to store a process that is executable by the processor, the process, when executed, configured to: determine for a block of messages transmitted through a computer network with forward error correction, whether any unrecovered data loss occurred during transmission; increase a level of forward error correction used to transmit through the computer network in response to unrecovered data loss; and decrease the level of forward error correction used to transmit through the computer network in response to no unrecovered data loss.

While there have been shown and described illustrative embodiments that provide for adaptive forward error correction in LPWANs, it is to be understood that various other adaptations and modifications may be made within the spirit and scope of the embodiments herein. For example, while certain embodiments are described herein with respect to using certain FEC techniques (e.g., XOR), FEC level definitions, FEC level increase/decrease increments/scales, machine learning models, unrecovered data loss discovery/reporting techniques, etc., embodiments are not limited as such and may include other examples, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a process, for a block of messages transmitted through a computer network with forward error correction, whether any unrecovered data loss occurred during transmission based on receipt, from a receiver of the block of messages, of an explicit communication indicating one or more messages of the block could not be recovered after forward error correction decoding;
   increasing, by the process, a level of forward error correction used to transmit through the computer network in response to unrecovered data loss; and
   decreasing, by the process, the level of forward error correction used to transmit through the computer network in response to no unrecovered data loss.

2. The method as in claim 1, wherein the level of the forward error correction is increased or decreased linearly.

3. The method as in claim 1, wherein the level of the forward error correction is increased or decreased exponentially.

4. The method as in claim 1, wherein the level of the forward error correction is increased or decreased based on a number of losses in the block of messages.

5. The method as in claim 1, wherein an upper layer process or application detects data losses.

6. The method as in claim 1, further comprising:
   using a machine learning model to predict when to increase or decrease the level of forward error correction.

7. The method as in claim 1, further comprising:
   using a machine learning model to optimize a size of a block used for forward error correction.

8. The method as in claim 1, wherein the block of messages includes messages configured as layer 2 frames or layer 3 packets.

9. The method as in claim 1, wherein the block of messages includes messages configured as full packets or SCHC fragments.

10. The method as in claim 1, wherein determining whether any unrecovered data loss occurred during transmission is based on an ack-on-error acknowledgement signaling an unrecovered data loss has occurred.

11. The method as in claim 1, wherein the process is executed on a receiving device or observability controller or agent.

12. The method as in claim 1, wherein the level of the forward error correction is restricted from increasing past a maximum forward error correction level or decreasing past a minimum forward error correction level.

13. A tangible, non-transitory, computer-readable medium having computer-executable instructions stored thereon that, when executed by a processor on a computer, cause the computer to perform a method comprising:
   determining for a block of messages transmitted through a computer network with forward error correction, whether any unrecovered data loss occurred during transmission based on receipt, from a receiver of the block of messages, of an explicit communication indicating one or more messages of the block could not be recovered after forward error correction decoding;
   increasing a level of forward error correction used to transmit through the computer network in response to unrecovered data loss; and
   decreasing the level of forward error correction used to transmit through the computer network in response to no unrecovered data loss.

14. The tangible, non-transitory, computer-readable medium as in claim 13, wherein the level of the forward error correction is increased or decreased linearly.

15. The tangible, non-transitory, computer-readable medium as in claim 13, wherein the level of the forward error correction is increased or decreased exponentially.

16. The tangible, non-transitory, computer-readable medium as in claim 13, wherein the level of the forward error correction is increased or decreased based on a number of losses in the block of messages.

17. The tangible, non-transitory, computer-readable medium as in claim 13, wherein an upper layer process or application detects data losses.

18. The tangible, non-transitory, computer-readable medium as in claim 13, the method further comprising:
using a machine learning model to predict when to increase or decrease the level of forward error correction.

19. The tangible, non-transitory, computer-readable medium as in claim 13, the method further comprising:
using a machine learning model to optimize a size of a block used for forward error correction.

20. An apparatus, comprising:
one or more network interfaces to communicate with a network;
a processor coupled to the one or more network interfaces and configured to execute one or more processes; and
a memory configured to store a process that is executable by the processor, the process, when executed, configured to:
determine for a block of messages transmitted through a computer network with forward error correction, whether any unrecovered data loss occurred during transmission based on receipt, from a receiver of the block of messages, of an explicit communication indicating one or more messages of the block could not be recovered after forward error correction decoding;
increase a level of forward error correction used to transmit through the computer network in response to unrecovered data loss; and
decrease the level of forward error correction used to transmit through the computer network in response to no unrecovered data loss.

* * * * *